May 27, 1958    R. B. SHIPLEY    2,836,733
ELECTRICAL LOAD DISPATCHER
Filed April 12, 1957

Inventor,
Randall B. Shipley,
by Arem Buyajian
His Agent.

United States Patent Office 2,836,733
Patented May 27, 1958

2,836,733

ELECTRICAL LOAD DISPATCHER

Randall B. Shipley, Chattanooga, Tenn.

Application April 12, 1957, Serial No. 652,402

8 Claims. (Cl. 307—57)

This invention relates to an electrical load dispatcher for an interconnected system of power generating stations and loads, and has for its principal object the most economical operation of the system from the standpoint of the cost of generation of the power, this cost generally being regarded as the fuel cost, though if desired it may include also other costs that may be functions of the generated power.

The invention determines, and at least indicates, and may also control the most economic distribution of the total load among the various generators for minimum-cost generation of the power. Thus it functions in a general way as a human load dispatcher organization but with a great saving in labor of computation and time and accuracy, as well as the cost of the organization.

As a product, the invention thus has three aspects: as an economic load dispatch computer, as an economic load dispatch indicator and error detector, and as an economic load dispatch controller. And its principles provide a method for the operation of a multistation system at minimum cost of generation possible for it.

The invention is useful not only for the routine operation of an existing system but also for the advance study of a contemplated system, and its other uses and applications will be apparent as the description progresses. The invention is simple in structure, capable of yielding exact solutions to the problem, highly flexible and adaptable to all systems, and capable of utilizing the system itself as part of the dispatcher.

Figure 2:
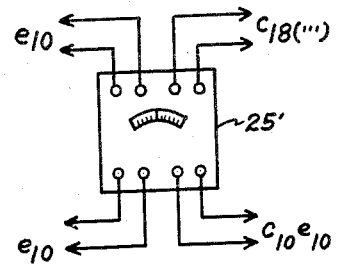
Figure 1:
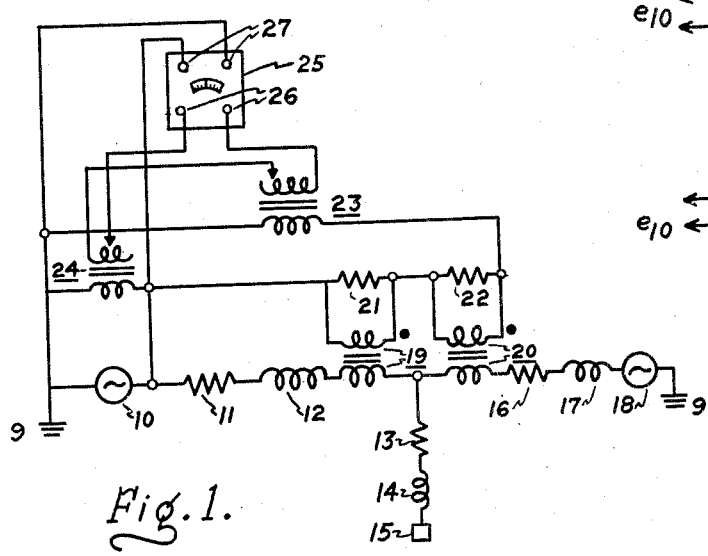
Figure 3:
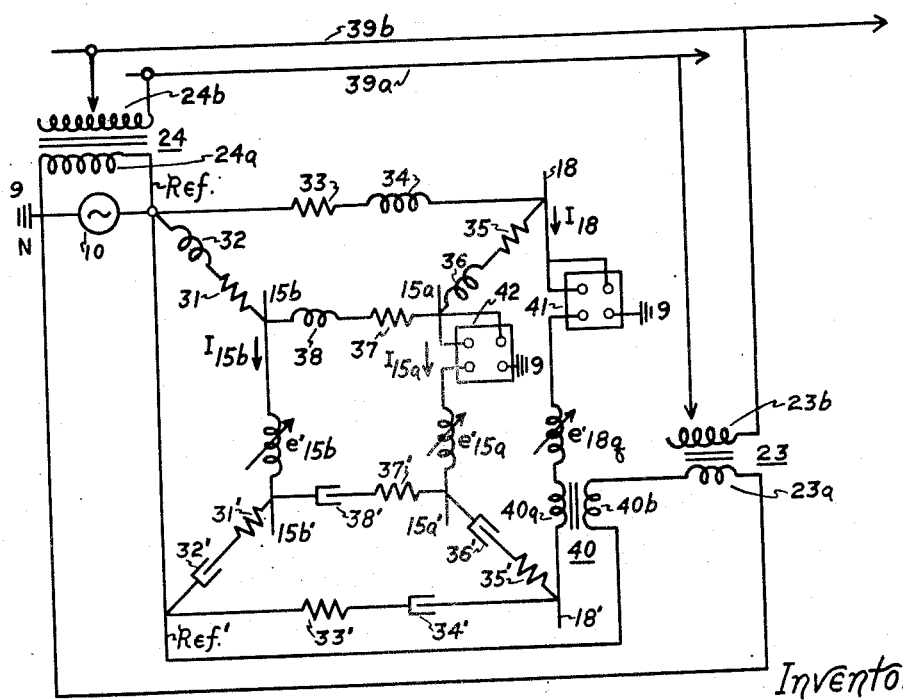

Fig. 1 is a diagrammatic representation of the organization of a preferred embodiment of the invention, making maximum use of the power system itself as part of the dispatcher, with Fig. 2 showing a modification of a portion thereof, while Fig. 3 shows an alternative form of the invention making minimum use of the actual power system parts.

The cost of electric power generation in terms of fuel cost varies a great deal from station to station. Not only the hydroelectric station differs from a steam station, but also the steam stations differ significantly among themselves, thus giving rise, in a multistation system, to the problem of the minimum-cost distribution of the load among the generators that may be widely separated from each other.

If there were no losses in either the generators or in the interconnecting lines, the economic dispatching of an interconnected system would have been very simple, namely, to load the lowest cost station first, and then to switch in the next higher cost station, etc. But a system of power stations are likely to extend over a territory of thousands of square miles, with very substantial power losses in the transmission network, as well as in the generators, and frequently it proves advantageous to load one or more higher cost generators along with the others for the sake of making a greater saving by reducing the line losses, because these losses generally vary with the distribution of the load among the generators.

In its most general form, the computation of the optimum distribution of load for the minimum cost of generation is very laborious and also involves advanced mathematics such as the matrix calculus, and therefore a computing device capable of making the computation is highly desirable.

A statement of the following physical principles governing the present problem will assist also in the understanding of the solution of the problem.

The minimum-cost distribution of the generator loads is characterized by the fact that, under that condition, the cost of delivering a small test increment of power to the system load will be the same from each generator. The truth of this may be made clearer by assuming that this is not so, and considering the consequence. Suppose it costs less to deliver the small test increment of load from generator $j$ than from generator $k$. If so, then it follows that a saving will be accomplished by transferring a small portion of the existing load from generator $k$ to generator $j$, and this transfer may be increased until further increase results in higher cost. This then goes to show that the original load distribution was not the most economical one, and if it had been so, the cost of delivery of the test incremental load would have been the same from each one of the generators, so this principle provides a basis for a test of the most economical load distribution.

It may be discerned on reflection that if, in an $n$ generator system, the $n$th generator is treated as the common reference for all the others and each one of the remaining $n-1$ generators is placed into economic load balance—that is, minimum-cost load-sharing relationship —with that reference generator, then every pair of generators will be in economic balance with each other automatically. This principle simplifies the dispatch problem a great deal, as each generator need be concerned to keep in economic step with only one generator, namely, the reference generator. Of course, load changes in other machines, activation or deactivation of other machines, may affect the economic balance of another machine, but when this happens, the latter machine can rebalance itself with respect to the reference generator under the new system condition.

A detailed exposition of the mathematical theory underlying the present invention is to be found in a scientific paper by the applicant and Martin Hochdorf under the title of "Exact Economic Dispatch—Digital Computer Solution," published by the American Institute of Electrical Engineers and appearing in the Institute's publication Power Apparatus and Systems, December 1956, starting on page 1147.

As developed and formulated in that paper, the general solution of the most economic load dispatch problem, stated concisely, is expressed by the following matrix equations. Using the symbols of that paper, $e_{Ref}$ is the bus-to-neutral voltage of the reference generator.

E is a column matrix each different element of which is a bus-to-neutral voltage.

$E_{Ref}$ is a column matrix each different element of which is $e_{Ref}$.

$e_j$ is an individual element of E identified by the subscript.

I is a column matrix each different element of which is the current of a different one of the buses.

$I_r$ is the modified matrix of I including only the reel components of the currents and excluding their quadrature components.

$i_k$ is an individual element of I identified by the subscript.

Z is the square matrix representing the self and mutual impedances of buses other than the reference generator bus with respect to the reference generator and due to the interconnecting network as implied in the equation $$E = E_{Ref} - ZI \tag{8}$$

R is the matrix of Z modified by excluding all reactances and retaining only the resistances.

$c_{Ref}$ is the incremental power generation cost of the reference generator per unit of power.

$c_j$ is the incremental power generator cost of generator $j$.

$C_{Ref}$ is a column matrix each element of which is $c_{Ref}$.

C is a diagonal matrix each different element of which is the incremental power-generation cost of each different one of the generators other than the reference generator.

For minimum cost operation, it is necessary and generally sufficient that the following matrix equation be satisfied $$C_{Ref} = C\left(1 - \frac{2}{e_{Ref}} R I_r\right) \tag{24}$$

which may be written also as the matrix equation $$C_{Ref} e_{Ref} - C(e_{Ref} - 2RI_r) = 0 \tag{24a}$$

This equation, in either form, is a sufficient condition for minimum cost generation when the elements of matrices $C_{Ref}$ and C are either constants or increase with load, as is the usual case.

As the matrix Equations 24 and 24a involve a summation in the second term within the parentheses, the summation extending to all the elements of the current matrix $I_r$ and the corresponding elements of the matrix of R, therefore, in a multisation system, this summation may include a large number of terms.

Referring now to Fig. 1 in greater detail, there will be seen, in a schematic diagram, two generators 10 and 18 and a load 15 interconnected by a three-branch star network of lines including a resistance 11 and reactance 12 in the branch connected to generator 10, a resistance 16 and reactance 17 in the branch connected to generator 18, and a resistance 13 and reactance 14 in the branch connected to load 15, with a common neutral or ground connection 9. We shall think of 10 as the reference generator. All parts 9–18 inclusive are the parts of the actual system. Other parts are added for the purposes of the present invention. A current transformer 19 is shown in the circuit of the reference generator 10 with a resistance burden 21; and a current transformer 20 in the circuit of generator 18 with a resistance burden 22. These current transformers may have any turns ratio, with appropriate resistance burdens, but for simplicity of exposition they will be considered here as of 1:1 turns ratio, in which case 21 will be a resistance twice as large as 11, and 22 twice as large as 16. Burdens 21 and 22 are connected in series with their voltages adding, and the resultant voltage is subtracted from the terminal voltage of 10, and the new resultant voltage is transformed through the potential transformer 23, the ratio of this transformer being the incremental cost of generation of generator 18. Thus we have a voltage multiplied by the incremental cost of power, to be used in establishing an economic balance between the two generators.

Independently of the foregoing, the terminal voltage of the reference generator 10 is multiplied by its incremental cost by transformation through the potential transformer 24, the ratio of this transformer being the incremental cost of generation of this machine.

The output voltage of transformer 23 is now subtracted from the output voltage of transformer 24 and the resultant voltage is impressed across one pair of terminals 26 of a null-reading dynamometer instrument 25. This instrument may be a dynamometer voltmeter having two potential coils the terminals of which are brought out to two separate pairs of terminals 26 and 27. This instrument may be considered also as a wattmeter of which the current coil has been converted to a potential coil. Finally, $e_{10}$, the voltage of the reference generator 10, is impressed across the other pair of terminals 27 of instrument 25 to test for ecoonmic balance between the two generators. The invention operates and is used as follows.

If the two voltages impressed on instrument 25 have a component in common, the instrument yields a positive or negative deflection; but if those two voltages have no component in common, a null reading results, and the two generators are in economic balance. This balance is secured as follows.

It is assumed that both generators have, as usual, automatic voltage regulation (not shown). It is further assumed that the system frequency is regulated at the reference generator 10 by the usual well-known means (not shown), and that the throttle control of generator 18 is available to the attendant of that generator. The attendant watches the instrument 25, and if it is showing either a positive or a negative reading, he turns the throttle on more or less as necessary to secure a null reading on the instrument, which then means that the two generators are in the desired economic load balance.

It can be verified by inspection of Fig. 1 and the foregoing explanations that the set up described constitutes an analog computer for the determination of the following economic load balance vector equation:

$$e_{10} \cdot \{c_{10} e_{10} - c_{18}(e_{10} - 2R_{11} I_{11} - 2R_{16} I_{16})\} = 0$$

in which $e_{10}$ represents the voltage of the reference generator 10

$c_{10}$ represents the incremental cost of generator 10

$c_{18}$ represents the incremental cost of generator 18

$R_{11}$, $I_{11}$ represent respectively the resistance and the current of part 11

$R_{16}$, $I_{16}$ represent respectively the resistance and the current of part 16 and the dot before the first brace means scalar multiplication.

When the instrument reads zero, the system satisfies this equation. Its meaning may be considered in two steps. The more apparent meaning is that the vector quantity within the braces has no component in phase with $e_{10}$; and if this is true, the second step follows, that the term $c_{18}(e_{10} - 2R_{11} I_{11} - 2R_{16} I_{16})$ in the equation has a component in phase with $e_{10}$ and exactly equal to $c_{10} e_{10}$. When this is recognized, it follows that any instrumentation or method of test that will compare the magnitude of $c_{10} e_{10}$ with the component of the aforementioned term $c_{18}(e_{10} - 2R_{11} I_{11} - 2R_{16} I_{16})$ in-phase therewith will also serve as a test to establish the desired economic load balance. For instance, the use of a two-phase wattmeter 25' (Fig. 2) modified as above (that is, the current coils converted to potential coils) will suggest itself as shown in Fig. 2, in which $e_{10}$ and the aforementioned $c_{18}(\ldots)$ are seen as impressed on one phase (upper terminals) of the instrument 25', and $e_{10}$ and $c_{10} e_{10}$ are seen as impressed on the other phase (lower terminals) of the instrument; and the polarities of the connections are so chosen as to cause the deflections tending to result from the two phases to oppose each other so that a null reading will represent equality of the two phases and therefore the presence of the balance sought for. As before, the station attendant adjusts the power of the prime mover of generator 18 to make the instrument 25' read zero.

It will be apprehended that any non-zero indication of either instrument 25 or 25' will be an indication of "error" in economic load balance and may therefore be used for automatic load dispatching. Thus, in any system in which the throttles are controlled automatically, responsive to one error or another, for instance, frequency error, the throttle control of generator 18 is arranged to respond to this economic-load-balance error so as to reduce it to a minimum, thus providing automatic load dispatching for the system for minimum-cost generation.

The economic load dispatching described above yields mathematically exact results under the following conditions.

The actual incremental generating costs of the two generators may be either constant or they may increase with load as they generally do.

If the relative cost figures for the two generators vary widely with load, then it is desirable that the turns ratio of at least one of the two cost-multiplying transformers 23 and 24 be variable and be readjusted with increasing or diminishing loads. As large system loads vary slowly, this readjustment can be made manually if desired, and of course it can also be made automatically by well-known electromechanical means, such as automatic tap changing means, or sliding-brush-adjusted transformer means, controlled by current-responsive relays, or like means, well-known in the analog computer art for the representation of non-linear functions.

The network interconnecting the two generators and the load may be expanded to any complexity of additional loads, generators and transmission lines, but it is desirable that the reactance-to-resistance ratios of the major branches of the network have similar values. Although in certain special cases wide variations in this ratio may still be consistent with the satisfactory operation of the above-described dispatching system, yet in the general case, with widely varying values of this ratio from branch to branch, preference is to be given to the modification shown in Fig. 3 which is rigorously correct.

Fig. 3 concerns itself with a power system made up of a generator 10 and a generator 18, a load 15a and another load 15b, all interconnected by four transmission lines forming a loop. Except for the restriction that the incremental costs should be either constants or increasing with load (and special cases relax these restrictions), this system is completely general. It is especially applicable where the X/R ratios of the different branches of the network of lines are so different that the method of Fig. 1 would not be applicable. Accordingly, the dispatcher is set up showing the transmission loop that interconnects the two generators 10 and 18 with the two loads 15a and 15b and consisting of the resistance 31 and reactance 32 in one branch, similarly 33 and 34 in the next branch, 35 and 36 in the next to the last branch, and 37 and 38 in the fourth branch closing the loop. These impedances may be either full-scale reproductions of those in the actual power system or scale representations of them, and this comment also applies to other parts of the dispatcher. A source of voltage marked 10 and representing the generator 10 to a desired scale is connected to the dispatcher network at the appropriate point for it; but the generator 18 is absent from the dispatcher and is represented only by a bus marked 18. So also are the loads 15a and 15b absent from the dispatcher and are represented by the busses 15a and 15b. The loop of the dispatcher, including parts 31 to 38 inclusive, is a scale representation of the transmission network loop, and is reproduced in conjugate by the loop of the primed impedances 31' to 38' inclusive, with conductive connections made between corresponding junction points of the two loops with such insertions as will be noted below. The primed resistances are the duplicates of the corresponding unprimed ones; while the primed reactances are the algebraic opposites of the unprimed ones. For instance, resistance 31' is the duplicate of resistance 31, while 32' is a capacitive (negative) reactance of the same magnitude as 32 because the latter is a positive (inductive) reactance.

Although generator 18 and loads 15a and 15b are absent from the dispatcher, the voltage required by 18 and the actual currents of 15a and 15b are telemetered (or established by other means) at the dispatcher and set up there as follows.

In the direct connection line between the busses 15a and 15a' and in series therewith, there is inserted a variable source of voltage marked $e'_{15a}$. This voltage, being variable in magnitude and phase, is so adjusted as to cause a current $I_{15a}$ to flow in that branch vectorially equal (or proportional) to the actual current of the absent load 15a.

It will be apparent to those skilled in the art that any desired current in the dispatcher network may also be established, correct as to magnitude and phase, by two voltages in series, one in phase with the reference voltage and variable in magnitude, and the other in quadrature with the reference voltage and variable in magnitude, instead of by one voltage variable in magnitude and phase.

The external current $I_{15a}$ to be reproduced in the dispatcher may be telemetered to it; or alternatively, the appropriate kilowatt and kilovar information may be furnished in which case $e'_{15a}$ is adjusted until a wattmeter connected in as part 42 reads the desired kilowatts to scale, and a varmeter connected in as part 42 reads the desired reactive kilovars to that same scale.

In the direct connection line between 15b and 15b' and in series therewith, there is inserted a variable source of voltage marked $e'_{15b}$. This voltage also is so adjusted as to cause a current $I_{15b}$ to flow in that branch equal (or proportional) to the actual current of the absent load 15b.

The foregoing comments regarding the branch 15a—15a' apply here also. The current $I_{15b}$ may be telemetered to the computer; or alternatively, the appropriate kilowatt and kilovar information may be communicated in which case the proper current $I_{15b}$ may be established with the help of a wattmeter and a varmeter as explained above for the branch 15a—15a'.

The potential of the bus 18 is now adjusted to the value prescribed for the absent generator 18 by inserting in the direct line between 18 and 18' and in series therewith a variable source of voltage marked $e'_{18q}$ in quadrature with the voltage $e_{10}$ and adjusted in magnitude until bus 18 attains the desired potential to neutral 9. Should this last adjustment indirectly alter the currents $I_{15a}$ and $I_{15b}$ in the dispatcher, the corresponding voltages $e'_{15a}$ and $e'_{15b}$ are readjusted to correct these currents. In any automatic control, these adjustments will of course take place simultaneously.

The means provided for establishing the economic load balance between the two generators will now be described. The reference voltage $e_{10}$ is multiplied by the incremental cost figure $c_{10}$ as explained above in connection with Fig. 1 by the potential transformer 24 the ratio of which represents this cost figure, so that the output voltage of 24b represents the previously discussed quantity $c_{10}e_{10}$. This voltage is impressed on the pair of busses 39a and 39b.

Inserted in the direct line between 18 and 18' and in series therewith is the primary winding 40a of a 1:1 ratio insulating transformer 40 with a secondary winding 40b. Across the windings of this transformer appear the equivalents of the network resistance drops noted above. Winding 40b is connected to the terminals of the reference generator 10, and the resultant voltage is multiplied by the ratio of transformer 23, this ratio corresponding to the incremental cost $c_{18}$ of generator 18. The output voltage of this transformer, taken off the winding 23b, then represents the quantity formulated above as $c_{18}(...)$. The output terminals of winding 23b are connected to the pair of lines 39a and 39b for balance against the cost-multiplied output voltage of winding 24b; so under this condition, the desired components of $c_{18}(...)$ and $c_{10}e_{10}$ are automatically forced to have the proper value for minimum cost, and the proper economic share of generator 18 in the load is determined by measurements with meter 41 as follows. Two such instruments are used, one as a wattmeter and the other as a varmeter, with their current coils inserted in series in the direct line between 18 and 18', and their potential coils connected in parallel between bus 18 and the neutral 9. The wattmeter reads the economic watt load of generator 18, and the varmeter the proper reactive load of generator 18 to establish the required voltage at its terminals.

Although the dispatcher networks may indicate big powers, actually there will be no such powers within the dispatcher, the explanation of this being that the wattmeters get their currents from one part of the dispatcher where the voltages are small, and they get their voltages from another part of the dispatcher where the currents are small or zero. For instance, the voltage impressed on wattmeter 41 is the voltage from bus 18 to neutral 9, but this circuit is open and no current flows from 18 to 9 except that in the potential coil of the wattmeter; and the current that flows in the wattmeter comes from a portion of the dispatcher network where the voltages are the impedance drops of the network.

In the highest voltage power systems substantial charging currents flow in the lines due to the shunt capacitances of the lines. This, however, raises no problem in the present invention because as the resistances and reactances of the external network are reproduced to a scale in the dispatcher, it is only necessary and wholly sufficient to reproduce also these capacitances at their proper locations and to the same scale as the other elements. Alternatively, these charging currents may be looked upon as leading power factor loads, and so treated in the dispatcher.

As the dispatcher admits of setting up, within the dispatcher, of a scale reproduction of the external transmission network, any changes that may be made in the external system can be carried out simply and directly in the dispatcher network too, and thus another feature of flexibility and convenience of the dispatcher of the present invention becomes evident. The dispatcher may be easily and helpfully modified not only to conform to actual changes in the external system, but also for the study of contemplated changes in the system.

The invention may now be extended to a multistation power system by adding more generators to the dispatcher, following the pattern given for generator 18 in Fig. 3.

Other modifications of the dispatcher will become evident when the mathematical relationship that must exist between various voltages are realized. The voltage most difficult to obtain is the summation of the $RI_r$ drop as described in the above-mentioned paper entitled "Exact Economic Dispatch—Digital Computer Solution." For example, suppose that a scale model of the power system is constructed, as is usually done, on the familiar A. C. network analyzer. The analyzer may be arranged so that each bus current is made up of two components—one exactly in phase with the reference voltage and the other exactly in quadrature with the reference voltage. Now if these inphase components of currents are forced to flow into the respective busses of another scale model of the power transmission system, voltages will exist between the reference bus and each one of other buses. The components of these drops that are in phase with the reference voltage are the required voltage drops. Thus, the generator powers of the original model can be adjusted for the proper relationship between the voltages. Incidentally, the drops to the load busses can be used to determine the incremental cost of delivering power to these busses. Line charging currents can be included with the bus currents, or neglected, or handled analogously to the way they are handled on alternating current network analyzers.

While I have described and explained the now preferred embodiments and modes of use of my invention, in the light of the disclosures here made and the mathematical principles expounded here and in said scientific paper, it will be apparent to those skilled in the art that various modifications may be made in them without the spirit of the invention and the scope of the appended claims.

I claim as my invention:

1. The method of dispatching the loads of an electrical power system for minimum-cost generation and delivery of power to said loads, said system comprising $n$ generators including a reference generator and $n-1$ other generators, $m$ loads, a separate bus associated with each generator and a separate bus associated with each load, and a transmission network interconnecting said buses; said system having a predetermined operating frequency; said generators having predetermined operating line-to-neutral voltages and independent power-generation costs per unit of incremental power, and a set of bus currents constituting a column matrix I with a real-part matrix $I_r$ and quadrature-part matrix $I_q$; said transmission network being characterized by an $\{(n-1)+m\}$ square impedance matrix Z, with resistive-part matrix R and reactive-part matrix X, and defining the self and mutual impedances among said $\{(n-1)+m\}$ members of said buses with respect to said reference generator bus; said method of dispatching including the processes of controlling the field excitation of each one of said generators to maintain said operating voltages under load; controlling the power input of said reference generator to maintain said system frequency under load; and controlling the power input of each one of said $(n-1)$ generators to substantially satisfy the generator portion of the matrix equation $$C_{Ref}e_{Ref} - C(E_{Ref} - 2RI_r) = 0$$

$C_{Ref}$ being a column matrix each element of which is said power generation cost per unit of incremental power of said reference generator, $E_{Ref}$ being a column matrix each element of which is said operating voltage of said reference generator, C being the diagonal matrix of said power costs per unit of incremental power of said buses, R being said resistive-part of said impedance matrix Z, and $I_r$ being said real-part of said current matrix I.

2. The method of electrical load dispatching recited in claim 1 for the system of said claim, said equation being set up on a separate voltage-magnitude and phase-angle responsive null-reading dynamometer instrument associated with each one of said $(n-1)$ generators and adapted to yield a deflection as a function of the algebraic error of economic loading of said associated generator.

3. The electrical load dispatcher for a power system for minimum-cost generation and delivery of power to loads on said system, said system comprising at least two generators and at least one load, and buses corresponding to said generators and said load interconnected by a transmission network; said generators having independently regulated voltages and being characterized by independent power generation costs per unit of incremental power, one of said generators being frequency-regulated as a reference generator, and the other generator being controlled for its share in said load for said minimum-cost operation; said transmission network being characterized by an impedance matrix Z representing the self and mutual impedances among said busses with respect to the bus of said reference generator with resistive part R; said dispatcher comprising an impedance network simulating said transmission network, voltage means, and voltage multiplying means organized to develop the voltage defined by the matrix expression $$C_{Ref}e_{Ref} - C(E_{Ref} - 2RI_r)$$

$C_{Ref}$ being a column matrix, each element thereof representing the power generation cost of said reference generator per unit of incremental power, $e_{Ref}$ said operating voltage of said reference generator, $E_{Ref}$ a column matrix each element of which is $e_{Ref}$ C a diagonal matrix each element thereof representing said power generation cost at one of said buses R said resistive part of said transmission-network impedance matrix Z, I a column matrix each element thereof representing a different bus current, and an instrument adapted to receive said voltage and to yield a deflection indicative of a component of said voltage defined by the matrix expression $$C_{Ref}e_{Ref} - C(E_{Ref} - 2RI_r)$$

said $I_r$ being the matrix of the real components of said currents in phase with said reference voltage, a null value of said component voltage representing said minimum-cost operating condition of said two generators.

4. The electrical load dispatcher for a power system for minimum-cost power generation and delivery by said system, said system comprising a plurality of generators and loads interconnected by a transmission network and forming a plurality of junction points; said system having a predetermined operating frequency; said generators having different predetermined operating voltages to neutral and different costs of power generation per unit of incremental power, one of said generators being regulated for said frequency as a reference generator, and each one of the other generators being controlled as to its share in said loads; said transmission network being characterized by a set of self and mutual impedances with reference to said reference generator among said junction points of said network and constituting a square matrix Z with resistive part R and reactive part X; said dispatcher comprising two networks, one of said two networks being a scale reproduction of said transmission network and the second one of said two networks being the conjugate of the first network, and a conductive cross connection between corresponding junction points on said two networks; a source of voltage to neutral representing said reference voltage to a voltage scale and connected to said network at a junction point corresponding to the junction point of said reference generator with said transmission network; a variable source of voltage inserted within and in series with each cross connection of a pair of load junction points and adapted to force in each one of said cross connections a current representing vectorially, to a current scale, the current of the corresponding load on said system; a variable source of quadrature voltage sufficient to raise the voltage to neutral of said generator junction point to said predetermined value to said voltage scale; resistance and transformer means associated with said two networks to develop to appropriate scale the voltage matrix $2RI_r$ characteristic of said transmission network and organized to subtract said voltage from said reference voltage $e_{Ref}$ to yield the matrix $(E_{Ref} - 2RI_r)$ corresponding to the generators, and transformer means to multiply this latter voltage by the appropriate diagonal elements of the diagonal matrix C each different element thereof representing said cost of bus power for a different one of said buses to develop the resultant voltage matrix $C(E_{Ref} - 2RI_r)$ for those elements corresponding to the generator buses; transformer means associated with said reference voltage source to multiply said reference voltage by said cost of generation of said reference generator to develop the resultant voltage $C_{Ref}e_{Ref}$; and conductive connections between the circuits of said two resultant voltages to oppose each other to establish said minimum cost generating condition for said system, the appropriate load for each generator being measurable by a wattmeter and varmeter tapping for voltage said voltage to neutral at said generator junction point and for current the current in said cross connection of said pair of corresponding generator junction points of said two networks.

5. An alternating current electric power system characterized with a load dispatch for minimum cost of power generation, said system comprising two generators having different costs of power generation and interconnected with a load through a transmission network having substantial power losses, one of said generators having, as a reference generator, throttle means set to maintain a desired electrical frequency for the system, and the remaining generator having throttle means set to render the matrix quantity, $$C_{Ref}e_{Ref} - C(E_{Ref} - 2RI_r)$$

at said latter generator substantially zero.

6. The power system of claim 5, a dynamometer instrument being associated with said latter generator to indicate the value of said matrix quantity at said generator.

7. An alternating current electric power system characterized with a load dispatch for minimum cost of power generation, said system comprising a plurality of generators having different costs of power generation and interconnected with a plurality of loads through a transmission network having substantial power losses, one of said generators having, as a reference generator, throttle means set to maintain a desired electrical frequency for the system, each one of the remaining generators having throttle means set to render the matrix quantity, $$C_{Ref}e_{Ref} - C(E_{Ref} - 2RI_r)$$

at said generator substantially zero.

8. The power system of claim 7, a dynamometer instrument being associated with each one of said generators, other than said reference generator, to indicate the value of said matrix quantity at said generator as a measure of the error of the throttle setting of said generator.

No references cited.